United States Patent
Smith (10) Patent No.: US 10,640,417 B2
(45) Date of Patent: May 5, 2020

(54) THERMO-ELECTRIC METHOD FOR TEXTURING OF GLASS SURFACES

(71) Applicant: CORNING INCORPORATED, Corning, NY (US)

(72) Inventor: Nicholas James Smith, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 822 days.

(21) Appl. No.: 15/044,350

(22) Filed: Feb. 16, 2016

(65) Prior Publication Data
US 2016/0159684 A1 Jun. 9, 2016

Related U.S. Application Data

(62) Division of application No. 13/660,702, filed on Oct. 25, 2012, now Pat. No. 9,272,945.

(51) Int. Cl.
| | | |
|---|---|---|
| C03C 19/00 | (2006.01) | |
| C03C 15/00 | (2006.01) | |
| C03C 23/00 | (2006.01) | |

(52) U.S. Cl.
CPC .............. *C03C 15/00* (2013.01); *C03C 19/00* (2013.01); *C03C 23/009* (2013.01); *C03C 2204/08* (2013.01); *Y10T 428/24355* (2015.01)

(58) Field of Classification Search
CPC ................... C03C 23/009; C03C 2204/08
See application file for complete search history.

(56) References Cited

U.S. PATENT DOCUMENTS

| | | |
|---|---|---|
| 3,811,855 A | 5/1974 | Carlson et al. |
| 6,465,381 B1 | 10/2002 | Lautenschlager et al. |
| 6,547,980 B1 | 4/2003 | Kurachi et al. |
| 7,776,229 B2 | 8/2010 | Kishi |
| 2004/0138044 A1* | 7/2004 | Sakaguchi ............ C03C 3/083 501/69 |
| 2006/0174652 A1 | 8/2006 | Khanarian et al. |

(Continued)

FOREIGN PATENT DOCUMENTS

| | | |
|---|---|---|
| JP | 2008094713 | 4/2008 |
| JP | 2009107878 | 5/2009 |

(Continued)

OTHER PUBLICATIONS

Patent Cooperation Treaty International Notification of Transmittal of the International Search Report and The Written Opinion of the International Searching Authority, international application No. PCT/US2013/066098: dated Jan. 30, 2014, 11 pages.

(Continued)

*Primary Examiner* — William P Watkins, III (57) ABSTRACT

A thermo-electric method for texturing a glass surface including, for example, simultaneously heating a glass substrate to a temperature less than its glass transition temperature and applying a bias across the glass substrate using a template electrode. The applied bias at the processing temperature induces localized ion migration within the glass, which results in the formation in the glass surface of a negative topographical image of the pattern formed in the electrode.

9 Claims, 7 Drawing Sheets

(56) References Cited

U.S. PATENT DOCUMENTS

| | | | |
|---|---|---|---|
| 2007/0208509 A1* | 9/2007 | Davis | B82Y 30/00 |
| | | | 702/1 |
| 2008/0245109 A1 | 10/2008 | Flemming et al. | |
| 2009/0174118 A1 | 7/2009 | Maeda et al. | |
| 2010/0112341 A1 | 5/2010 | Takagi et al. | |
| 2012/0015758 A1 | 1/2012 | Wu et al. | |
| 2012/0152758 A1 | 6/2012 | Tsujino et al. | |
| 2015/0111040 A1 | 4/2015 | Funatsu et al. | |

FOREIGN PATENT DOCUMENTS

| | | | |
|---|---|---|---|
| JP | 2011025169 A | 2/2011 | |
| JP | 2011063476 | 3/2011 | |
| JP | 2012197235 A | 10/2012 | |
| JP | 2014201456 A | 10/2014 | |
| WO | 2014132983 A1 | 9/2014 | |

OTHER PUBLICATIONS

Poumellec et al., "Surface Topography Change Induced by Poling in Ge Doped Silica Glass Films.".

Rusan et al., "A New Method for Recording Phase Optical Structures in Glasses," Glass Physics and Chemistry, 2010, vol. 36, No. 4, pp. 513-516.

Takagi et al., "Electrostatic Imprint Process for Glass," Applied Physics Express 1, 2008, 3 pages.

XP-002718946, Brunkov et al., "Submicron-Resolved Relief Formation in Poled Glasses and Glass-Metal Nanocomposites," Technical Physics Letters 2008, vol. 34, No. 12, pp. 1030-1033.

Chinese First Office Action CN201380056242.6 dated Oct. 27, 2016, China Patent Office.

English Translation of JP2015539706 Office Action dated Jul. 4, 2017, Japan Patent Office.

English Translation of JP2015539706 Office Action dated Mar. 13, 2019, Japan Patent Office, 3 Pgs.

* cited by examiner

THERMO-ELECTRIC METHOD FOR TEXTURING OF GLASS SURFACES

CROSS-REFERENCE TO RELATED APPLICATIONS

This application is a divisional application and claims the benefit of priority under 35 U.S.C. § 120 of U.S. application Ser. No. 13/660,702 filed on Oct. 25, 2012, the content of which is relied upon and incorporated herein by reference in its entirety.

BACKGROUND

The present disclosure relates generally to the texturing of glass surfaces, and more particularly to a thermo-electric method for selectively inducing ion migration within a glass substrate to form a textured surface on the substrate.

The ability to create topographical features in glass surfaces is of interest for a variety of applications. Surface texturing can be used, for example, to modify the optical properties of a glass substrate. Topographical features in glass surfaces can be used to create anti-reflective or anti-glare surfaces, and custom patterns like diffraction gratings can produce optical scattering for light-trapping. Tailored surface topography can also be useful for controlling electrostatic discharge and for affecting other properties such as wetting behavior, adhesion, and general aesthetics through the creation of surface roughness or discrete surface features.

A number of methods can be used to form textured glass surfaces. For example, glass substrates can be coated with a texturized layer. In contrast to such surface coatings, a variety of "direct-write" techniques that incorporate robust, chemically durable, and strongly integrated patterning directly into the surface of the glass itself are of significant interest. However, most direct-write methods involve either (i) a mask-and-etch approach to provide selective surface modification using corrosive solutions or ion bombardment, or (ii) high-temperature processing, where the glass is embossed by heating to above its glass transition temperature ($T_g$).

In view of the foregoing, it would be advantageous to provide "direct-write" texture or patterns in a glass surface, without the need for a separate etch step, and at relatively low processing temperatures, i.e., below the glass transition temperature of the glass.

SUMMARY

A method for forming texture in a surface of a glass substrate includes providing a glass substrate comprising a glass material having a glass transition temperature, contacting a surface of the glass substrate with a template electrode, heating the glass surface to a temperature less than the glass transition temperature, and applying a DC bias to the electrode effective to transport ions within the glass substrate and form a textured glass surface. The template electrode can be maintained in physical contact with the glass surface during acts of heating and applying, for example, by moving the template electrode with respect to the glass substrate, by moving the glass substrate with respect to the template electrode, or a combination of both.

In embodiments, glass surface is heated to a temperature at least 150° C. less than the glass transition temperature of the glass substrate. For example, the glass surface can be heated to a temperature in a range of 100 to 300° C. or 300 to 600° C. In order to induce the migration of positive ions within the glass substrate, a voltage is applied such that the template electrode is positively biased with respect to the glass substrate.

The method can be applied to glass substrates having a variety of glass compositions, including glass substrates where a bulk composition of the glass material includes less than 1 mol % alkali metal oxide or alkaline earth metal oxide (e.g., less than 1 mol % alkali metal oxide). In related embodiments, the textured surface can be differentially etched with a subsequent HF-etching step to enhance/control the feature size.

A further method for forming texture in a surface of a glass substrate comprises contacting a glass surface of a glass substrate and a template electrode at from 20° C. to less than the glass transition temperature of the substrate, and applying a DC bias to the electrode effective to transport ions within the glass substrate and form a textured glass surface. The glass substrate may be actively heated or cooled during the contacting and applying in order to maintain the contacted surface at a desired temperature.

The disclosure further relates to an article having a glass surface formed by the method. In such an article, the glass surface comprises a glass material having a bulk composition and a textured region formed in a surface of the glass material. The textured region comprises a plurality of raised and lowered features, the raised features having substantially the same composition as the bulk composition, and the lowered features being deficient with respect to the bulk composition in at least one alkali, alkaline earth or transition metal. For instance, a composition of the at least one alkali, alkaline earth or transition metal in the lowered features can be less than 50% (e.g., less than 50, 20 or 10%) of the corresponding bulk composition.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION

A method is disclosed for texturing a surface of a glass substrate. The method utilizes a template electrode, which is provided with topographic features to be transferred to the glass. The template electrode is brought into contact with a surface of the glass to form a template electrode-glass substrate assembly and the glass substrate is then heated to a temperature less than its glass transition temperature while a DC bias is applied across the substrate. The DC bias is chosen such that the template electrode is positively biased relative to the glass. In an embodiment, an AC voltage can be overlaid with a DC bias to achieve the desired effect.

As an electrode, the template electrode comprises an electrically-conductive material that can be adapted to provide electrical contact with the glass substrate. An effective template electrode is more electrically-conductive than the glass such that it can provide the desired level of electric field uniformity over the texturing area. The template electrode may be formed from a metal, semiconductor, semimetal, or conductive non-metal. In embodiments, the template electrode material has a sufficiently high viscosity at the process temperature such that the electrode topography is retained over the desired process timeframe.

As a template, the template electrode includes a surface with a topography intended to be conveyed, in a negative sense, to the glass surface. The size and dimension of the topography is not limited, and may include features characterized by a length scale in the range of nanometers, micrometers or larger.

During the process, the combination of voltage and temperature induces ion migration within the glass proximate the interface with the template electrode, the net effect of which is a semi-conformal adapting of the glass surface topography to the template topography, which results in the formation in the glass surface of a negative topographical image of the texture formed in the electrode. After the electrode pattern is incorporated into the glass substrate, the glass can be cooled and the electrode separated from the glass.

The texturing can be formed over a portion or substantially all of a major surface of the substrate. The texturing can include a regular or periodic pattern or shape such as lines, gratings, arrays, channels, or other shapes. Shapes may be arranged concentrically. Further example texturing is random, pseudo-random or aperiodic, and can include bumps, divots, hillocks, pillars, matte-finish, as well as light-trapping or light-scattering texture including roughness over a variety of length scales. A surface having texture may be an engineered surface, e.g., microlens, Fresnel lens, Lotus-leaf, moth-eye, waveguide or other light-guiding structure. Individual textured features may have a variety of cross-sectional shapes, including square, circle, oval, triangle, etc. Shaped features may be convex or concave such as convex or concave spheroids or ovoids.

The magnitude of applied voltage can range from 100V to 10,000V, and can depend, for example, on the composition of the glass substrate and the geometry of the texture. For instance, in the case of low-resistivity, high-alkali content glasses, voltages in the range of 100V to 1,000V can be used, while for high-resistivity, alkali-free glasses, higher voltages in the range of 1,000V to 10,000V, e.g., 2000 to 4000V can be used.

The voltage may be applied in a series of steps to achieve a maximum desired value, or ramped in a current-limited configuration to a process voltage. The latter approach can be used to obviate thermal dielectric breakdown caused by the passage of excess current through the glass substrate. Alternatively, because breakdown strength of the glass varies with glass composition, surface texture and chemistry, ambient temperature, in addition to other factors, an "instant-on" approach for applying the voltage may be used under some conditions. Thicker glass would also generally allow for application of higher voltages while avoiding electrical breakdown.

The voltage can be applied for a period of time in the range of 1 minute to several hours, e.g., from 5 to 60 minutes or from 15 to 30 minutes. The glass substrate can then be cooled to about room temperature and separated from the template electrode. The applied voltage may be removed prior to cooling, or after cooling.

A system for executing the disclosed process may comprise suitable heat and voltage sources that can be adapted to simultaneously heat and bias a template electrode-glass substrate assembly in a controlled manner. In an embodiment, the system can be used to control the process atmosphere. Texturing under either vacuum, inert gas (e.g., dry $N_2$), or permeable gas (e.g., He) can help minimize atmosphere effects that might be detrimental to the process.

The disclosed method can be applied to a variety of different glass compositions, including alkali-free and alkali-rich glasses, and can be carried out at processing temperatures that are substantially less than the glass transition temperature ($T_g$) of the glass substrate.

As used herein, the term "alkali" refers to alkali metals (e.g., Li, Na, K, Rb and Cs) and "alkaline-earth" refers to alkaline-earth metals (e.g., Be, Mg, Ca, Sr and Ba) unless the context clearly indicates otherwise. In addition to being applicable to alkali-rich glasses, which contain a relatively high concentration of mobile alkali ions (e.g., greater than 1%), the disclosed method may be used with low-alkali glasses, including alkali-free glasses. Low-alkali glasses of commercial and technical interest often contain a significant concentration of alkaline-earth metals in their composition to achieve the desired properties.

The alkali and/or alkaline earth oxides in a glass matrix, in contrast to glass network formers such as Si, B, and Al, do not participate in forming the network structure. Alkali and alkaline earth oxides are instead considered network modifiers. Network modifiers may increase the coordination of network former cations like B, help to charge-compensate Al in silicate glasses, or create non-bridging oxygens by breaking Si—O—Si bonds, for example. Example low-alkali glasses have an alkali metal oxide content of less than 1 mol. % (e.g., less than 0.5, 0.2, 0.1 or 0.05 mol % alkali). As network-modifier elements like alkali and alkaline-earth elements are typically more weakly-bound into the network structure of the glass, it is these species that will typically exhibit substantial mobility under electric fields. In this context, the migration of ions in the glass is often used implicitly to describe the migration of these mobile species with respect to the remainder of the glass network. Ion-depleted regions of the glass surface proximate to the template electrode thus also describe a glass composition where the network-modifier species—alkali and/or alkaline-earth ions—are depleted, with the network-forming species remaining and comprising the vast majority of the composition in said layer.

Glasses are usually formed by solidification from the melt. The glassy state can be distinguished from the liquid state through a number of physical properties, including atomic structure and many temperature-dependent physical properties like volume expansion, heat capacity, etc. The formation of a glass from a liquid can be described in a plot of specific volume as a function of temperature. On cooling a liquid, there is a discontinuous change in volume at the melting point if the liquid crystallizes. However, if no crystallization occurs, the volume of the liquid decreases at about the same rate as above the melting point until there is a decrease in the expansion coefficient at a range of temperature called the glass transformation range. Below this temperature the glass structure does not relax at the applied cooling rate. If slower cooling rates are used so that the time available for the structure to relax is increased, the super-cooled liquid persists to a lower temperature, and a higher-density glass results. The glass transition temperature corresponds to the temperature at which a given glass composition will exhibit a viscosity of $10^{13}$ Poise (or $10^{12}$ Pa-s) within the glass transformation range, and is often taken as a useful process parameter for delineating between when a glass is effectively solid versus liquid over convenient timescales.

Applicants have surprisingly determined that the disclosed thermo-electric texturing can be performed by heating the glass substrate to a temperature that is significantly less than its glass transition temperature ($T_g$). A temperature that is significantly less than the glass transition temperature is at least 150° C. less than glass transition temperature, e.g., at least 150, 200, 250 or 300° C. less than $T_g$. Appreciating that a reduced viscosity and bulk volumetric relaxation is an inherent part of the mechanism by which the topography forms in texturing glass by other methods like hot-embossing, one would assume that a necessary processing temperature would be at or even greater than the glass transition temperature. Lower process temperatures are desirable, however, for ease of manufacturing and bulk dimensional stability.

As an example, thermo-electric texturing of a sodium aluminosilicate glass substrate was carried out at 250° C. This glass has a nominal composition, expressed as weight percent of oxides, of 66% $SiO_2$, 13.6% $Al_2O_3$, 13.7% $Na_2O$, 1.7% $K_2O$, 4.0% MgO, 0.5% CaO, 0.4% $SnO_2$ and 0.02% $Fe_2O_3$, and has a strain point, which can be regarded as a lower bound for the glass transition range, equal to 563° C. The $T_g$ of this glass is approximately 613° C.

The process is applicable to a wide variety of glass substrates. Suitable glass substrates can have a thickness ranging from about 0.3 to 3 mm, for example. Alkali-rich, low-resistivity glasses can generally be textured at lower temperatures ranging from 25° C. to $T_g$−150° C., e.g., in the range of 100° C. up to 300° C. or ($T_g$−150° C.), whichever is lower. Nominally alkali-free (<1 mol. % alkali) glasses generally exhibit higher-resistivity, and can be textured using higher relative processing temperatures from 250° C. to $T_g$−150° C., e.g., in the range of 350° C. up to 600° C. or ($T_g$−150° C.), whichever is lower. During texturing, the glass substrate can be maintained at a suitable temperature by heating or by cooling. The disclosed texturing method can be implemented at the bottom of a draw, for instance, or during a glass annealing step. Moreover, the glass substrate can be heated or cooled locally (i.e., proximate to the glass surface) or globally (i.e., such that temperature is controlled over substantially all of the glass substrate).

The resulting textured glass substrate includes a locally-modified composition that is commensurate with the imparted texture. It has been shown experimentally that the migration of ions within the glass under DC bias changes the near-surface composition of the substrate such that the compositional changes are laterally heterogeneous and commensurate with the induced texture. Specifically, the ion migration results in a depletion of ions only in regions of electrical contact with the "high" points on the template (which correspond to the "low" points on the resulting textured glass surface). This effect is illustrated schematically in FIG. 1.

Figure 1:
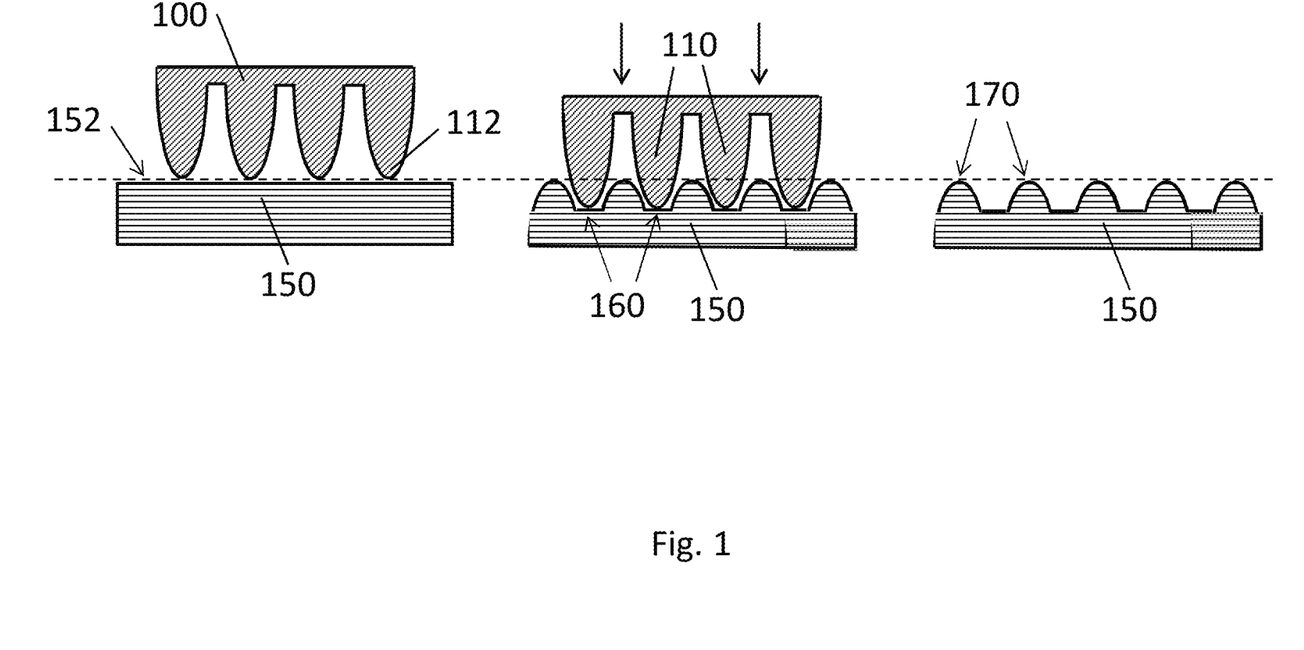
FIG. 1 is a schematic illustrating an embodiment of the disclosed thermo-electric glass-texturing process.

In FIG. 1, a template electrode 100 has a plurality of raised features 110. Distal ends 112 of respective raised features are placed in physical contact with a surface 152 of a glass substrate 150. Under the effect of applied temperature and voltage, ion migration is induced in the glass substrate, which creates in a plurality of ion-depletion regions 160 and an attendant local reduction of glass volume proximate the raised features of the template electrode.

Throughout the process, contact (i.e., physical contact or electrical contact) can be maintained between the template electrode and the glass substrate, for example, due to the effects of electrostatic pressure at the interface. Contact can be maintained by moving the electrode as the glass locally recedes, as indicated by the vertical arrows, or by moving the glass substrate with respect to the electrode, or both In the resultant textured glass, the composition in the near surface region is depleted of migrated species in those recessed regions that were engaged by the electrode. Because ion migration does not occur in regions out of contact with the template electrode, the glass composition in the raised regions 170 of the textured glass is substantially equal to the bulk composition of the substrate. As can be seen with reference to FIG. 1, the "high" points 170 in the textured glass correspond to the original glass surface (indicated by the dashed line), while the "low" ion-depleted regions 160 in the textured glass are recessed with respect to the original glass surface.

Because the resulting textured glass comprises a compositional patterning as well as a spatial texturing, additional optional processing can be readily used to fine-tune the surface texture. In one embodiment, differential etching can be used to enhance the topographical aspect ratio. Differential etching can be used because the ion depleted zones at the base of the defined features has been observed in some glasses to etch faster than un-affected areas. Acid-etching, for example, can be used without an etch mask following the thermo-electric texturing to enhance or fine-tune the surface topographical features. This may be advantageous for applications benefiting from greater aspect-ratio features, such as pillar-like structures.

Glass etching chemistries may include aqueous solutions of hydrofluoric acid (e.g., 1-5 vol. %), or aqueous mixtures of HF or other fluoride compounds with another mineral acid such as hydrochloric, nitric, or sulfuric acid. High-pH alkaline solutions (e.g. alkali- or alkaline-earth hydroxides) or dry-etch methods may alternatively be used to achieve the desired differential etch.

In a further embodiment, the texturing process can be used to form a refractive index grating. Because the ion-depleted glass surface will generally have a lower refractive index compared to the native glass composition, a useful lateral contrast in refractive index may be observed in addition to and commensurate with the topographical features that are created. Such structure may have applications in optics.

Figure 2A:
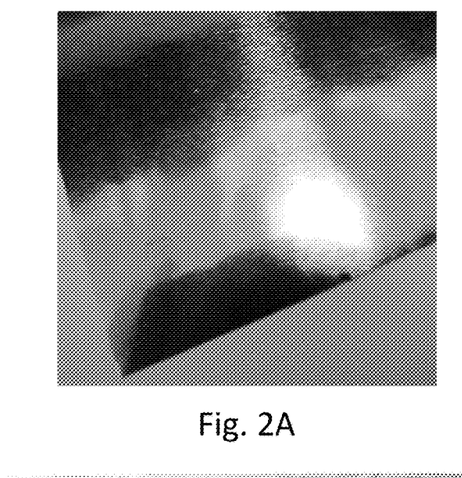
FIG. 2A is an optical micrograph of a templated electrode.
Figure 2B:
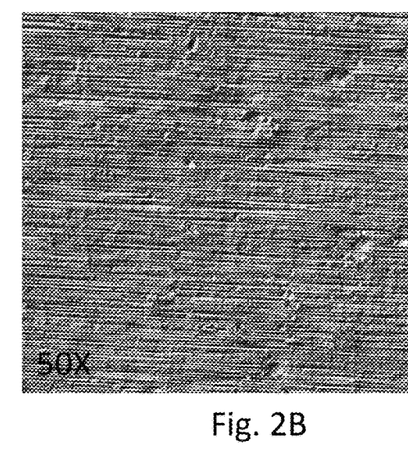
FIG. 2B is a higher magnification image showing the templated topography of the electrode in FIG. 2A.

A photograph of a platinum foil used as a template electrode is shown in FIGS. 2A and 2B. The brush-line texture of the foil is more clearly seen with reference to FIG. 2B, which is a higher magnification image (50×).

Figure 3:
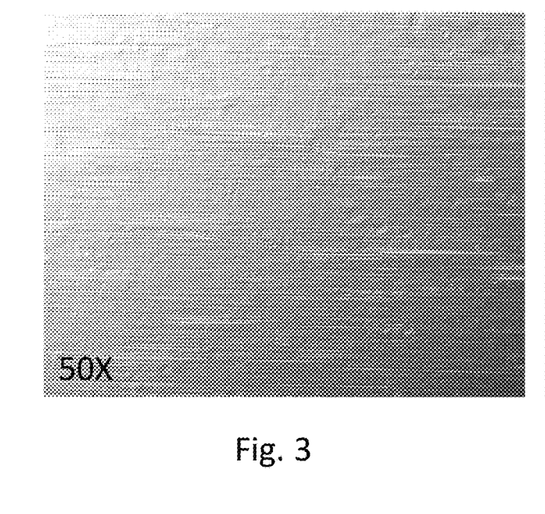
FIG. 3 is an optical micrograph of a textured surface in a sodium aluminosilicate glass substrate.
Figure 4:
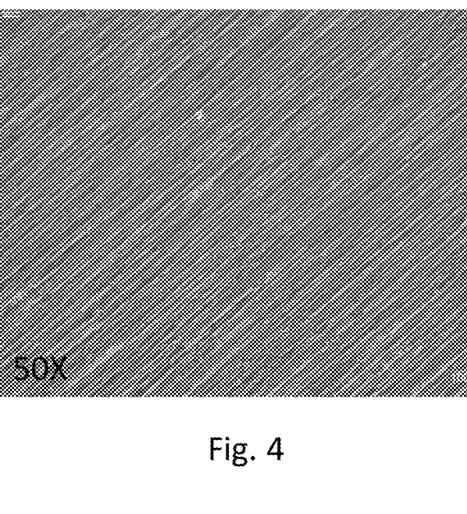
FIG. 4 is an optical micrograph of a textured surface in a barium boroaluminosilicate glass substrate.
Figure 5A:
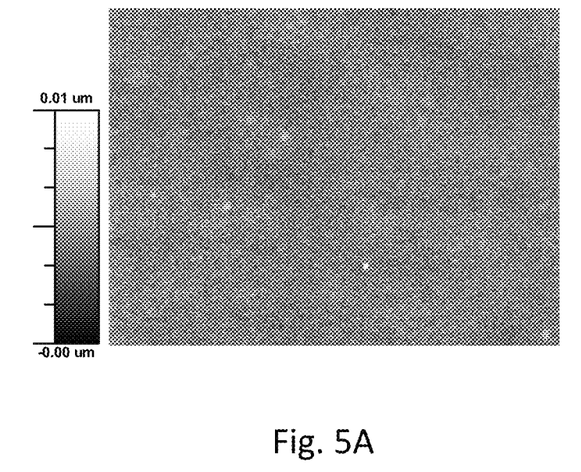
FIG. 5A is an optical profilometer height image of the sodium aluminosilicate glass substrate of FIG. 3 before texturing.
Figure 5B:
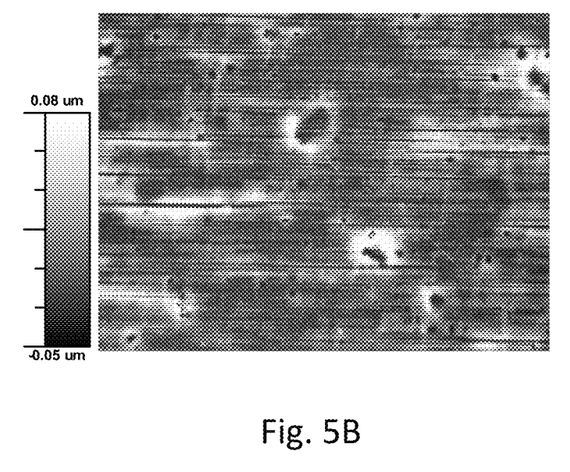
FIG. 5B is a corresponding profilometer image of the same glass substrate after texturing.

With reference to the template electrode images of FIGS. 2A and 2B, corresponding differential interference contrast photographs of a texture-induced sodium aluminosilicate glass substrate and a nominally alkali-free barium boroaluminosilicate glass are shown in FIGS. 3 and 4, respectively. Optical profilometer height images of the sodium aluminosilicate glass substrate of FIG. 3 before and after texturing are shown in FIGS. 5A and 5B, respectively.

Figure 6A:
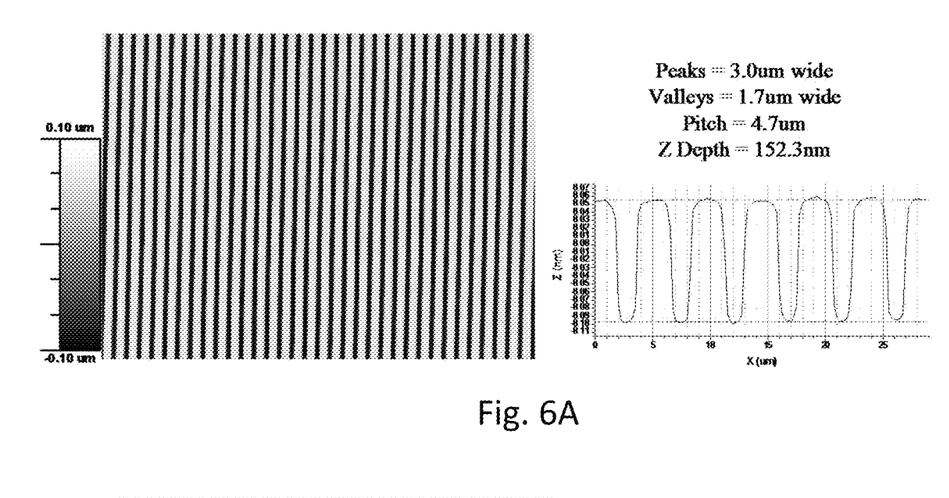
FIG. 6A is an optical profilometer height image and the associated profilometer trace of a templated electrode.
Figure 6B:
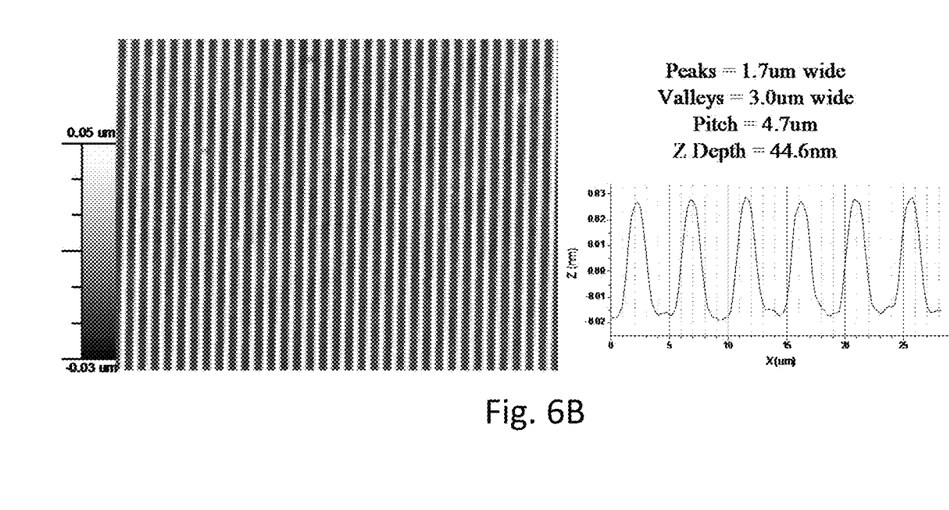
FIG. 6B is the corresponding height image and trace of a glass substrate following texturing with the templated electrode of FIG. 6A.

Topographical height images, height cross-sections, and dimensions statistics from (A) a photolithography-textured line template electrode, and (B) a sodium aluminosilicate glass surface having features replicated from the template electrode using the disclosed thermo-electric treatment are shown in FIGS. 6A and 6B. That is, FIG. 6A shows the texture in the template electrode and FIG. 6B shows the corresponding texture in the glass substrate. In the FIG. 6 example, the glass was heated to a temperature of 250° C., and the maximum applied voltage was 400V.

Shown in FIG. 7 are topographical features replicated on a sodium aluminosilicate glass surface from a photolithography-textured template electrode. FIGS. 7A and 7B show height images from a variety of 1.5 μm to 30 μm-wide line features on the glass surface. FIG. 7C is an example feature with a sub-micron lateral dimension. FIG. 7D shows summary histograms of z-height distributions from topographical images, indicating a 25-50 nm range of feature depths.

Cross-sectional SEM micrographs of a textured glass substrate are shown in FIG. 8. The 70°-tilt images shown in FIGS. 8A and 8B highlight the textured topography, while the backscattered image in FIG. 8C reveals subtle evidence of contrast between the unaffected glass region 804 and the adjacent reduced-height (ion-depleted) regions 802a and 802b. The micrograph in FIG. 8D was obtained after etching the same sample in 1% HF for 1 minute, and both highlights the extent and character of the compositionally-modified zone, and also demonstrates that the etch rate within the network-modifier-depleted, reduced-height regions is substantially faster than that of the initial glass composition in this embodiment.

Figure 9:
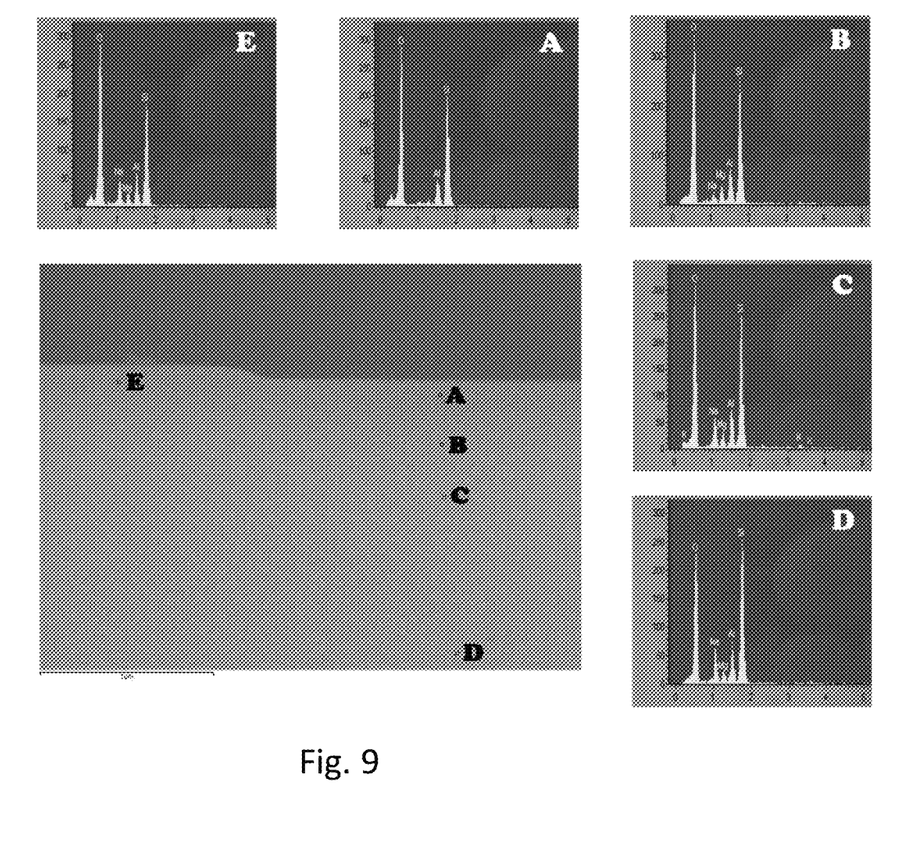
FIG. 9 shows energy-dispersive x-ray spectra for a textured glass substrate.

Energy-dispersive x-ray spectroscopy (EDS) plots (A-E) are shown in FIG. 9 together with a cross-sectional SEM micrograph depicting the corresponding sampled regions A-E on a textured sodium aluminosilicate glass substrate. The SEM micrograph shows an unmodified glass region adjacent point E, and an ion-depleted region adjacent point A. The bulk glass composition at point D is shown in spectrum D. The bulk composition D is substantially unchanged at region E and also at region C, which is about 0.5 micron below the original glass surface. At points A and B, however, which lie within the altered zone, a demonstrable depletion of sodium, magnesium and potassium is observed.

In embodiments, the disclosed process involves providing a template electrode, contacting the template electrode with a surface of a glass substrate, heating the substrate to a temperature that is less than its glass transition temperature, and applying a voltage to the electrode to induce localized ion migration in the glass and form texture in the glass surface. The template electrode is positively biased with respect to the glass. The glass surface in contact with the template electrode may be referred to as the "anode-side" or "anodic" surface of the glass. The opposite side of the glass may be referred to as the "cathode-side" or "cathodic" surface of the glass.

In order to provide field uniformity over the texturing area, the template electrode material can be more electrically conductive than the glass at the processing temperature. By way of example, the template electrode can be formed from or coated with a noble metal or an oxidation-resistant metal Au, Pt, Pd, TiN, TiAlN, etc. A counter-electrode can be provided on the non-textured side of the glass substrate, i.e., the backside, in order to provide for field uniformity over the texturing area.

The electrodes can comprise a bulk material, or a thin film. For instance, the electrodes can be separate components that are brought into contact with the glass substrate for the texturing step, and then separated from the glass. Alternatively, the electrodes, and particularly the backside cathode, can be a conductive thin film that is formed directly on a surface of the glass. The template electrode can be textured using a variety of methods, including lithography, mechanical machining, etc.

During the acts of heating and applying a voltage, the template electrode and the glass substrate can be maintained in physical contact. In example embodiments, a flat glass substrate can be textured using a flat template electrode. A shaped or curved glass substrate on the other hand can be textured using a template electrode having a corresponding shape or curvature. Thus, the template electrode and the glass substrate can be shape-matched to provide electrode-to-glass contact during the texturing steps at least over the desired texturing area. Even if initial contact between the template electrode and the glass surface is not intimate, the electrostatic pressure created at the interface when the voltage is applied can pull the two surfaces into intimate contact.

The general term "glass" is used herein to refer to the substrate material, but the substrate material is meant to include any of a broad class of ionically-conductive inorganic materials comprising glasses, glass ceramics, and ceramics that can be formed from a viscous state.

In accordance with one embodiment, a glass substrate may be formed using a down-draw technique. A glass substrate may comprise a glass ribbon, for example, that may be rolled prior to or following texturing and stored for later use. A typical glass ribbon includes a long dimension L (length L) generally parallel to its drawn edges, and a width W transverse to the length.

The glass ribbon may be sized such that texture can be formed across the length and/or width of the ribbon. In embodiments, texture may be formed on a glass ribbon in a manner analogous to the manner in which images are sequentially formed on a strip of photographic film, such that a textured ribbon need only be separated along one dimension to form an individual device or component, e.g., a display device.

Either before or after to the formation of texture on a glass ribbon, the ribbon can be cut into individual segments. Thus, in one approach, the disclosed texturing process is suitable for batch processing, while in a second approach the texturing is suitable for continuous or roll-to-roll processing such as in the case of flexible glass substrates.

The term "flexible" is generally used to describe the glass substrate, although the substrate need not be flexed during texturing. A flexible substrate is thin enough and has a high enough strength to produce a bend radii less than about 30 cm, less than about 10 cm, less than about 5 cm, less than about 2 cm, or less than about 1 cm. A continuous or semi-continuous manufacturing process can be used to fabricate a textured glass substrate, potentially involving a bending of the substrate during the process. In other words, a final application for the textured glass may not require flexing of the substrate, but a cost effective manufacturing process may. A further example involves bending of a textured glass substrate during use. Devices of components comprising textured glass substrates may be manufactured for flexible or conformable applications in either a continuous or flat batch process.

The invention will be further clarified by the following examples.

Examples 1 and 2—Brush-Line Texture with Alkali-Rich and Nominally Alkali-Free Glass Substrates Template electrodes were formed using high-purity platinum (Pt) foil (ESPI; 3N5 purity) having brush-line surface texture. The semi-random texture is shown in FIG. 2A and is an inherent result of the process used to draw the foil to its final thickness.

Companion experiments were performed using different glass compositions under different conditions.

In one example, flat sodium aluminosilicate glass substrates were used in conjunction with a Pt foil anode and a counter electrode made using graphite foil sheet. After positioning the glass between the electrodes, the assembly was placed into a vacuum chamber at ~$1\times10^{-4}$ Torr and heated to 300° C. After equilibrating at 300° C. for 15 min, 100V was applied to the anode. An initial increase in current was observed, followed by a slow decay as the depletion layer formed. The current was allowed to decay to 10% of its peak value (limited to 5 mA max), after which the voltage was stepped up to 200V. With a current decay allowance of 10% of its peak value at each step, the voltage was increased next to 300V and then to 400V. Following the voltage ramp, the sample was cooled to room temperature, the voltage removed, the chamber vented, and the template electrode-glass assembly manually separated.

In a further example, barium boroaluminosilicate flat glass samples having a bulk sodium content of about 500 ppm were used in conjunction with the Pt foil anode and a sputter-deposited Pt thin film backside cathode. As with the previous example, the assembly was placed into a vacuum chamber at ~$1\times10^{-6}$ Torr. The sample was heated to 600° C. After equilibrating at temperature for 15 min, 2,500V was applied to the anode for 30 minutes. The sample was then cooled to room temperature, the voltage removed, the chamber vented, and the assembly manually separated.

Photographs of the resulting textured glass substrates are shown in FIGS. 3 and 4, respectively which demonstrating the brush-line texturing on the anode-side glass surface matching that of the template electrode foil. FIG. 5B shows topographical data from the sodium aluminosilicate glass surface confirming that the optical contrast in the microscope image (FIG. 3) is attributable to induced nanoscale topography.

Manual probing corroborated the direct-written texture as a hard, integral parts of the glass surfaces, while XPS and SIMS analyses confirmed a glassy, locally modifier-depleted composition in both examples. Examples 1 and 2 demonstrate the direct-writing of semi-arbitrary texture in both alkali-rich and nominally-alkali-free glass compositions.

Example 3—Lithographically-textured lines on Sodium Aluminosilicate Glass

A template electrode having a well-defined series of features with various geometries was prepared using lithographic methods. To form the template electrode, a 300 nm thin film of plasma-enhanced, chemically vapor-deposited silica (PECVD $SiO_2$) was deposited onto a pre-cleaned silicon substrate. Inter-digitated line texture were incorporated into the silica layer using traditional lithography. Contact layers of either titanium nitride (TiN) or platinum (Pt) were then deposited on the textured surface to create a conductive template electrode structure.

Flat sodium aluminosilicate glass substrates were textured using the lithographically-prepared template electrodes. A graphite foil was used as the cathode.

After arranging the glass between the electrodes, the assembly was placed into a vacuum chamber at ~$1\times10^{-4}$ Torr and heated to 300° C. After equilibrating at 300° C. for 15 min, 100V was applied to the anode. An initial increase in current was observed, followed by a slow decay as the depletion layer formed. The current was allowed to decay to 10% of its peak value (limited to 5 mA max), after which the voltage was stepped up to 200V. With a current decay allowance of 10% of its peak value at each step, the voltage was increased from 200V to 300V and then to 400V. The sample was then cooled to room temperature, the voltage removed, the chamber vented, and the assembly manually separated.

Figure 7A:
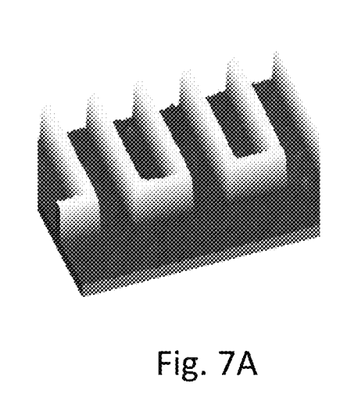
FIGS. 7A-7C are optical profilometer height images of templated electrode according to various embodiments.
Figure 7B:
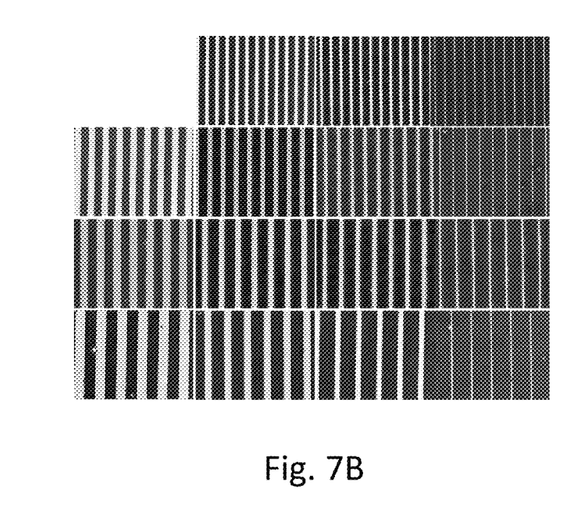
Figure 7C:
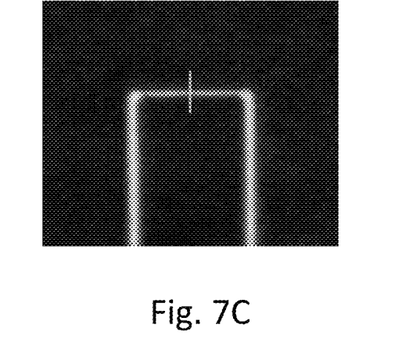

An example of the line textured replicated from the template electrode (FIG. 6A) onto the glass surface (FIG. 6B) is shown in FIG. 6. The textured glass substrate has lateral fidelity to the template electrode. FIG. 7 summarizes topographical data from the glass surface where a variety of feature widths and spacings were used, including a sub-micron, 800 nm line as shown in FIG. 7C.

Figure 7D:
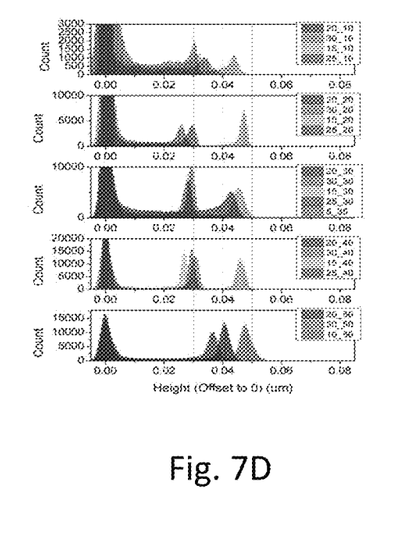
FIG. 7D shows histograms of the height distributions in textured glass substrates.
Figure 8A:
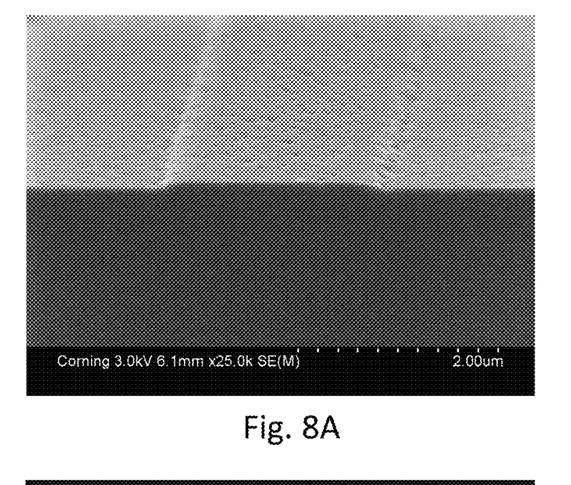
FIGS. 8A and 8B are cross-sectional SEM micrographs of a textured glass substrate.
Figure 8B:
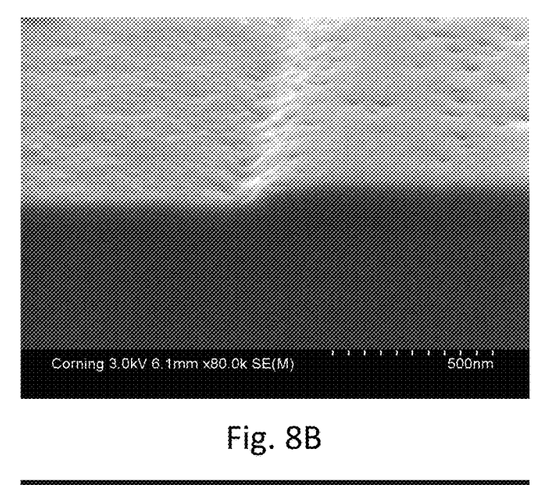
Figure 8C:
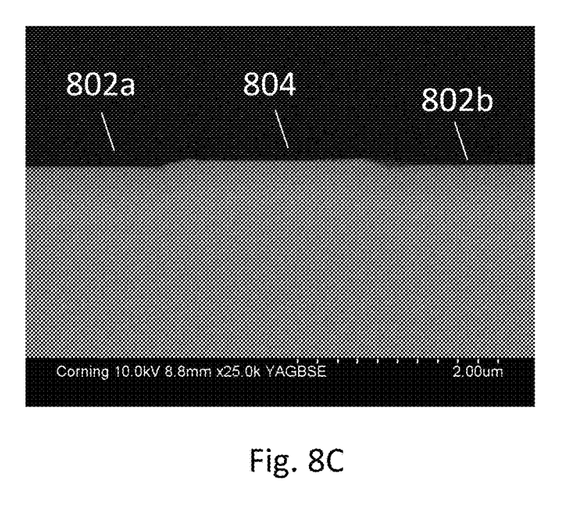
FIG. 8C is a backscattered image showing relief topography in a textured glass substrate.
Figure 8D:
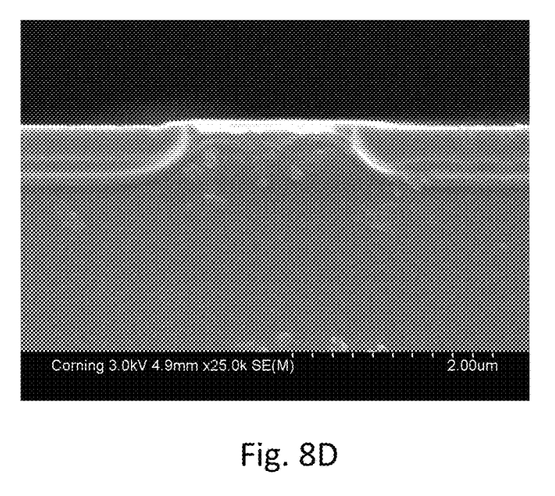
FIG. 8D is an SEM micrograph of a textured glass substrate following optional chemical etching.

The data in FIG. 7D quantify the feature heights over a range of about 30 to 50 nm, suggestive of an intrinsic limitation of height conformality through some nanoscale range due to the stabilization of a depletion layer in the regions of contact with the template electrode. Manual probing confirmed that the direct-written texture is a hard, integral part of the glass surfaces. The results of cross-sectional SEM analysis of the textured surfaces are summarized in FIGS. 8A and 8B.

Disclosed herein is a process for creating a textured glass surface. The process uses a templated electrode together with the application of heat and an applied voltage to induce localized ion migration that incorporates into the glass the texture or pattern from the electrode. The process can be carried out at relatively low temperatures, is maskless, and eliminates the need for chemical etchants or hazardous chemicals to selectively remove material in order to create topography.

In contrast to the application of a film or a coating, the textured glass surface that is created by the disclosed process is innately part of the original glass article, and therefore the texturing is monolithic to the underlying glass substrate. This results in a robust glass substrate that retains the hardness and the mechanical properties of the original glass surface.

Compared to embossing or other alternate methods, the relatively low processing temperatures and relatively short processing times associated with the disclosed approach mean that a textured glass substrate can be prepared with minimal geometric distortion or change in the original substrate dimensions, and without adversely affecting other material layers or device architectures indigenous to the substrate. The process can be used to create texture with nanometer-scale dimensions, which may be particularly suitable to avoiding light-scattering in a variety of display or cover glass applications.

Additional applications for the textured glass substrates include anti-reflection, anti-fogging (super hydrophilic), anti-smudge/anti-fingerprint, anti-fouling (when coated with hydrophobic chemistries such as fluorosilane) as well as combinations of these attributes.

As used herein, the singular forms "a," "an" and "the" include plural referents unless the context clearly dictates otherwise. Thus, for example, reference to an "alkali metal oxide" includes examples having two or more such "alkali metal oxides" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a glass substrate that comprises a glass material include embodiments where a glass substrate consists of a glass material and embodiments where a glass substrate consists essentially of a glass material.

Various modifications and variations can be made to the present disclosure without departing from the scope of the invention. Since modifications, combinations, sub-combinations, and variations of the disclosed embodiments incorporating the substance of the invention may occur to persons skilled in the art, the invention should be construed to include everything within the scope of the appended claims and their equivalents.

What is claimed is:

1. An article comprising:
   a glass having a bulk composition; and
   a textured region on a surface of the glass,
   wherein the textured region comprises a plurality of first features having substantially the same composition as the bulk composition, and a plurality of second features that are lowered with respect to the first feature and which have a depleted composition in at least one of an alkali, an alkaline earth, a transition metal, or a combination thereof with respect to the bulk composition;
   wherein the plurality of first features comprise a height ranging from about 30 nm to about 50 nm; and
   wherein the bulk composition of the glass comprises less than 1 mol % alkali metal oxide.

2. The article according to claim 1, wherein the depleted composition has an alkali, alkaline earth, or transition metal composition that is less than 50% of the bulk composition (in mol %).

3. The article according to claim 1, wherein the depleted composition has an alkali, alkaline earth, or transition metal composition that is less than 10% of the bulk composition (in mol %).

4. The article according to claim 1, wherein the bulk composition of the glass comprises less than 1 mol % alkaline earth metal oxide.

5. The article according to claim 1, wherein the article comprises a curved glass substrate.

6. An anti-reflective article comprising:
   a substrate material comprising a ceramic or glass ceramic and having a bulk composition; and
   a textured region on a surface of the substrate material,
   wherein the textured region comprises a plurality of raised and lowered features, the raised features having substantially the same composition as the bulk composition, and the lowered features being deficient with respect to the bulk composition in at least one alkali, alkaline earth or transition metal; and
   wherein the plurality of raised features comprise a height in the range from about 30 nm to about 50 nm.

7. The article according to claim 6, wherein the depleted composition has an alkali, alkaline earth, or transition metal composition that is less than 50% of the bulk composition (in mol %).

8. The article according to claim 6, wherein the depleted composition has an alkali, alkaline earth, or transition metal composition that is less than 10% of the bulk composition (in mol %).

9. An anti-glare article comprising:
   a substrate material comprising a ceramic or glass ceramic and having a bulk composition; and
   a textured region on a surface of the substrate material,
   wherein the textured region comprises a plurality of raised and lowered features, the raised features having substantially the same composition as the bulk composition, and the lowered features being deficient with respect to the bulk composition in at least one alkali, alkaline earth or transition metal; and
   wherein the plurality of raised features comprise a height ranging from about 30 nm to about 50 nm.

* * * * *